Patented Nov. 20, 1934

1,981,820

UNITED STATES PATENT OFFICE 1,981,820

PROCESS OF ELECTRODEPOSITING RHODIUM, BATH AND METHOD OF PREPARING THE SAME

Fritz Zimmermann, Newark, and Herbert E. Zschiegner, Woodbridge, N. J., assignors to Baker & Co., Inc., Newark, N. J., a corporation of New Jersey No Drawing. Application August 27, 1931, Serial No. 559,779

12 Claims. (Cl. 204—1)

This invention relates to an acid electrolyte containing a phosphate of rhodium and the method of electrodepositing rhodium therefrom.

One object of our invention is the production of an electrolyte which gives a whiter deposit than rhodium deposits made heretofore.

Another object of our invention is the provision of an electrolyte which may be used to form a coating of rhodium on tarnishable metal surfaces, such as silver or the like, which results in tarnish proofing the cheaper metals.

Further objects and advantages of our invention will be in part obvious and in part specifically pointed out in the description hereinafter contained, which discloses several embodiments of our invention, it being expressly understood, however, that various changes may be made in practice within the scope of the appended claims without digressing from our inventive idea.

It is known that rhodium has been plated out of sulphuric acid solutions. We have discovered that by dissolving a rhodium phosphate, an acid rhodium phosphate, a basic rhodium phosphate, or any rhodium compound containing the phosphate radical, in sulphuric acid, an electrolyte is obtained which gives a rhodium deposit which far surpasses any rhodium deposit so far produced.

Our method of producing the rhodium phosphate compound is to take 2 grams of rhodium in the form of rhodium hydrate and dissolve it in 5 c.c. of 85% phosphoric acid by strongly heating the same. To this solution is added a liter of aqueous sulphuric acid containing 20 c.c. of sulphuric acid per liter. If the rhodium phosphate compounds, neutral, acid, or basic rhodium phosphate compounds, are available as such, they may be dissolved in a dilute aqueous solution of sulphuric acid, the concentration by volume of sulphuric acid being preferably from 1 to 10%. The rhodium contents of the bath are preferably from .2 to .3%, and the phosphoric acid contents of the bath ranges from about .3 to .9%, but these percentages are merely illustrative, and may be varied and still be within the contemplation of our invention.

Another way of preparing the electrolyte is to dissolve a rhodium sulphate in phosphoric acid and then this mixture is dissolved in sulphuric acid so that a rhodium phosphate compound is obtained in a sulphuric acid solution.

Another way of preparing an electrolyte using a rhodium sulphate compound is to dissolve the rhodium sulphate compound in water so as to have a solution containing about 2 to 3 grams of rhodium per liter. Then sulphuric acid is added, so that the electrolyte will have a sulphuric acid concentration ranging from about 1 to 10% by volume. Then 3 c.c. of 85% C. P. phosphoric acid per gram of rhodium is added to the solution.

An additional way of preparing our electrolyte is to take any soluble rhodium salt, as, for instance, rhodium chloride, rhodium sulphate, or rhodium nitrate, and dissolve it in water. Then phosphoric acid or a soluble phosphate is added, and the solution is made neutral or alkaline by the addition of ammonia, ammonium hydrate, sodium hydrate or potassium hydrate. Carbonates, phosphates or other similar salts may be used. A precipitate of a rhodium phosphate or a basic rhodium phosphate compound is obtained and filtered off. This precipitate is then dissolved in aqueous sulphuric acid containing about 1 to 10% sulphuric acid by volume. This gives an electrolyte which may be used for electrodepositing rhodium. If further refinement is desired, the rhodium in solution may be reprecipitated as above, the precipitate filtered off, and then again dissolved in sulphuric acid.

When using any one of the above depositing baths or electrolytes, the temperature is, preferably, between 35° C. to 50° C., and the voltage used is, preferably, from 2.4 to 2.8. The usual direct current is employed. However, these figures are given as one embodiment only and may be varied without departing from the spirit of our invention.

We believe that we probably obtain in our electrolytes, complex rhodium phosphate compounds seemingly stable in dilute acid solutions at the temperatures mentioned. The chemistry of these compounds is not well understood at the present time, but we are certain that we have produced some rhodium compounds which do not correspond to the salts of any known phosphoric acid and we, therefore, believe that we have discovered that other phosphoric acids exist which are not sufficiently stable to be isolated and have not been described in the literature. We have found that by varying the concentrations and the temperatures of our reacting solutions that a large number of different rhodium phosphate compounds can be obtained in which the ratio of the rhodium radical to the phosphate radical varies, so that different amounts of rhodium are contained in the molecules of the different rhodium compounds. In some instances, we also believe that some of the rhodium phosphate compounds contain hydroxy groups or radicals or acid groups or radicals. All of these complexes when used in sulphuric acid electrolytes give better rhodium deposits than those obtained heretofore. If we partly evaporate our electrolytes and afterwards bring them up to the same volume, or if the phosphate salt is dissolved in hot concentrated sulphuric acid, the rhodium compound in our electrolytes may undergo molecular changes and not give the same white deposits that are produced by our invention. This seems to confirm our belief that we have complex rhodium phosphate compounds in our electrolytes which are stable in dilute acid solutions at the temperatures mentioned. From the foregoing it will be seen that acid solutions are selected which do not destroy or decompose the rhodium phosphate compounds.

While the rhodium phosphate compounds have been described as being dissolved in a sulphuric acid solution, it is to be expressly understood that we may use other inorganic or organic acids, such as, phosphoric acid, nitric acid, acetic acid, tartaric acid, oxalic acid, or citric acid. All these acids may be used singly or in combination with one another to form electrolytes containing one or any number of the named acids.

When silver articles or articles made of other tarnishable metals are treated according to our invention, the rhodium deposit obtained is whiter and gives greater reflectivity to light than rhodium deposits made heretofore, and the color of the coating or deposit closely approximates and resembles that of silver. It is possible to deposit heavy rhodium coatings out of our electrolytes without having to resort to scratch brushing and polishing. This is of utmost commercial importance, as many articles made of metals are of such a nature that they do not allow scratch brushing or polishing after plating. Jewelry and silver articles may be plated according to our process while preserving the original finish and covering the articles with a white and strongly reflecting surface.

It is also within the contemplation of our invention to deposit rhodium on non-tarnishing surfaces as, for instance, jewelry, watch cases and similar articles, where a durable, brilliant surface of intense whiteness is desired.

We do not restrict our invention to plating of metallic surfaces solely, but we intend to include non-metallic surfaces as, for instance, carbon and graphite.

What we claim is:

1. An electrolyte for depositing rhodium, which includes, a rhodium phosphate compound in a dilute sulphuric acid solution.

2. A method of preparing an electrolyte for depositing metals, which includes, dissolving rhodium hydrate in phosphoric acid and then adding this solution to dilute sulphuric acid.

3. A method of preparing an electrolyte containing rhodium, which comprises, dissolving rhodium hydrate in phosphoric acid, and then adding this solution to a solution containing an acid which will not decompose the rhodium compound.

4. A method of tarnish proofing or coating silver or other tarnishable metals, which includes, placing the silver or other article in an electrolyte consisting essentially of rhodium phosphate ions in an acid solution and passing a D. C. current through the electrolyte said acid solution being selected so as not to decompose the rhodium phosphate.

5. An electrolyte for depositing bright, lustrous rhodium for decorative purposes, which includes, a rhodium phosphate compound in an acid solution, said acid solution being selected so as not to decompose the rhodium phosphate compound.

6. An electrolyte for depositing bright, lustrous rhodium for decorative purposes, which contains dilute sulphuric acid and the reaction product of a rhodium compound and phosphoric acid.

7. An electrolyte for depositing rhodium, which includes, complex rhodium phosphate ions in a dilute sulphuric acid solution.

8. A method of plating metals or carbonaceous surfaces with a bright and lustrous coating of rhodium for decorative purposes, which comprises, passing a D. C. electric current through an electrolyte containing a rhodium phosphate compound in a dilute sulphuric acid solution.

9. A method of plating metals with a bright and lustrous coating of rhodium, which comprises, passing a D. C. electric current through an electrolyte containing a rhodium phosphate compound in an acid solution, the acid solution being selected so as not to decompose the rhodium phosphate compound.

10. An electrolyte for depositing rhodium, which consists of a rhodium phosphate compound in a dilute phosphoric acid solution.

11. An electrolyte adapted for use in the electrodeposition of brilliant, white deposits of rhodium for decorative purposes which contains about .2% to .3% of rhodium as a rhodium phosphate compound and about 1 to 10% of sulphuric acid.

12. A method of plating a white, lustrous and durable coating of rhodium on metallic surfaces or the like for decorative purposes, which comprises, passing a D. C. current of about 2.4 to 2.8 volts through an aqueous bath containing about .2% to .3% of rhodium as a rhodium phosphate compound and about 1 to 10% of sulphuric acid, and maintaining the temperature of the bath at about 35° to 50° C. during the plating operation.

FRITZ ZIMMERMANN.
HERBERT E. ZSCHIEGNER.

CERTIFICATE OF CORRECTION.

Patent No. 1,981,820. November 20, 1934.

FRITZ ZIMMERMANN, ET AL.

It is hereby certified that error appears in the printed specification of the above numbered patent requiring correction as follows: Page 2, line 86, claim 4, strike out the word "ions"; and that the said Letters Patent should be read with this correction therein that the same may conform to the record of the case in the Patent Office.

Signed and sealed this 8th day of January, A. D. 1935.

(Seal)

Leslie Frazer
Acting Commissioner of Patents.